Figures 1, 2:
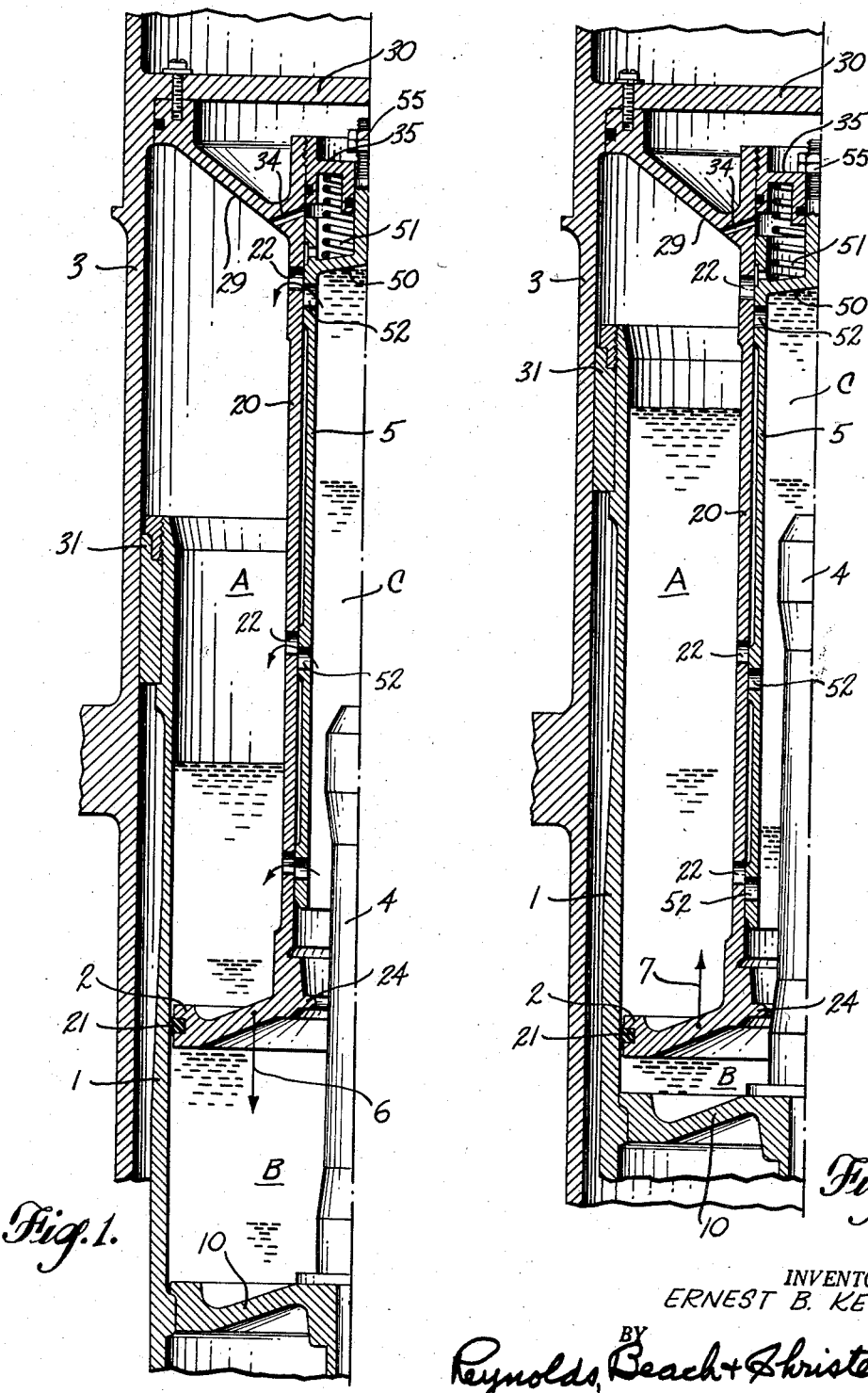

Oct. 23, 1956 — E. B. KEEFER — 2,767,978
OLEO SNUBBERS
Filed May 14, 1954

INVENTOR.
ERNEST B. KEEFER
BY Reynolds, Beach + Christensen
ATTORNEYS

United States Patent Office 2,767,978
Patented Oct. 23, 1956

2,767,978

OLEO SNUBBERS

Ernest B. Keefer, Seattle, Wash., assignor to Boeing Airplane Company, Seattle, Wash., a corporation of Delaware Application May 14, 1954, Serial No. 429,951

5 Claims. (Cl. 267—64)

This invention relates to shock struts of the type generally termed oleo shock struts or oleo pneumatic shock absorbers. It deals particularly with mechanism in such shock absorbers for snubbing rebound after relative movement of the parts of the shock absorber from an unstressed position, such movement being usually compressive movement.

It has long been customary to snub the rebound movement of the parts in shock absorbers, but frequently the snubbing means have consisted of simple flap valves, or the like, of limited area and flow capacity, and capable of handling or arranged to handle only a relatively small volume of liquid. Only a small portion of the total volume of oil in the shock absorber is passed through the snubber, with the result that extremely high pressures are developed and must be dealt with in the design of the snubber. According to the present invention, the main flow and the entire volume of liquid passing between the two chambers of the cylinder, as divided by the piston, is itself restricted. Accordingly, since the same amount of energy is required to be absorbed by the snubber, for movement of given extent, regardless of the volume of oil which passes through it, the pressures to be dealt with within the shock strut can be much lower according to the present design, wherein the main flow of oil is restricted and large volumes are dealt with, than in former snubbers wherein the limited volumes of oil must absorb the same amount of energy.

It is a further object of the invention to provide a snubber of the type generally indicated above, which shall be of simple design, and readily incorporated in oleo pneumatic shock absorbers of generally conventional design otherwise.

The invention is shown herein as arranged to snub the extensional stroke, because as the airplane makes first contact with the runway the shock strut is compressed, yet it will be obvious that the same principles might be incorporated in a snubber to snub movement in the opposite sense wherever that might be desirable. At first touch-down, in a normal shock strut, the shock absorber is compressed, yet the airplane is still airborne to a major extent. Unless the rebound of the shock absorber is snubbed, it will promptly reextend, causing the airplane to bounce. By snubbing the shock strut parts are slowly returned to the position they should assume when they contact the ground. Bouncing is eliminated, and if the airplane settles onto the shock strut before the latter reextends fully, the shock strut by so much is nearer its position of static ground-borne equilibrium. It will be understood also that while the invention is shown incorporated in a generally conventional oleo pneumatic shock absorber, it might readily be applied to any type of shock strut which is subject to reciprocating movement upon impact and rebound and which operates by passing liquid through or past a variable restriction, or metering orifice.

The principles of the present invention will be better understood from the accompanying drawings, wherein they are shown incorporated in a typical form of shock strut, and after study of the following specification, including the attached claims.

Figures 1 and 2 are axial sectional views through the shock absorber, showing one-half thereof only, Figure 1 showing parts in movement under the application of compressive forces, and Figure 2 showing the parts near the start of a rebound, or extensional, movement.

The shock absorber comprises in general a cylinder 1 closed at one end, as indicated at 10, and generally open at its opposite end, a piston 2, which is reciprocable axially within the cylinder and which divides it into a first chamber A, and a second chamber B, and a closure for the open end of the cylinder 1, which can be constituted by a tube 3 which is slidingly interfitted with the cylinder 1, usually exteriorly thereof, and provided with a head 30 to which is secured the base 29 of a hollow piston rod 20 that supports the piston 2. Suitable packing at 31 (shown conventionally) effects a seal between the slidable tube 3 and the cylinder 1, and similar packing 21 effects a seal between the piston 2 and the interior wall of the cylinder 1. Other packing is employed as necessary.

The shock absorber comprises also liquid flow metering elements which, in one or both senses of movement, regulate the flow of liquid from the chamber B to the chamber A, or vice versa. Such metering elements are shown herein as a metering pin 4, supported fixedly upon the cylinder head 10 at the closed end of the cylinder, and projecting into the bore of the hollow piston rod 20. The piston is apertured to admit the metering pin to the piston rod's bore. The exterior of this metering pin 4 is suitably shaped and cooperates with a restricting ring 24 on the piston to restrict, at the proper time and in the proper degree, the flow of liquid between the chamber B and the hollow bore C of the piston rod 20. Ports 22 in the wall of the piston rod 20 afford communication between its interior C and the chamber A and hence between the chambers A and B. The conformation of the metering pin in relation to the restrictive ring 24 is such, as shown in Figure 2, to restrict greatly and in known manner the flow of liquid between the chamber B by way of the bore C and into the chamber A when parts approach or reach the limit of their compressive movement. The conformation of the parts may be such also, as shown, to effect restriction of flow as the parts approach or reach the limit of their extensional movement.

In between, however, there is nothing in the design of the liquid flow metering elements to effect a snubbing action, with the result that unless snubbing means are provided, there is nothing to prevent the extension of the parts upon rebound and following compression until the parts have reached nearly the limit of their extensional movement. It is not practicable to incorporate such snubbing mechanism in conjunction with the liquid flow metering elements described, and which are largely conventional, for if they were incorporated therein there would be the probability of adversely affecting the normal action of the liquid flow metering elements.

Accordingly, there is incorporated, according to the present invention, snubbing mechanism which will operate to snub at least the initial portion of the rebound, or extensional, movement, or until snubbing is no longer required. In essence, such snubbing mechanism includes valve mechanism capable of regulating the flow of all liquid between chambers B and A, and operating automatically so to do in the extensional sense. In the arrangement shown a valve sleeve 5 is slidably mounted for movement upon and with relation to the hollow piston rod 20. Preferably it is located within the bore chamber C. It is provided with ports 52, which cooperate with the piston rod's ports 22, so that in a position of approximate registry, more or less as shown in Figure 1, there is substantially free flow from chamber B through the bore C and into chamber A by way of the ports 52 and 22, except to the extent that such flow may be restricted by the liquid flow metering means, namely the pin 4 and the restricting ring 24. Such substantially free flow is illustrated in Figure 1, wherein the piston is moving relative to the cylinder in the axial compressive sense illustrated by the arrow 6. When, however, the rebound movement begins and the relative movement is in the axial extensional sense, illustrated by the arrow 7 in Figure 2, the valve sleeve 5 upon movement toward the piston 2, to the extent permitted by a limit stop 55, tends to greatly restrict but not entirely to close the port space formed between the ports 52 and 22, and this serves to restrict the entire flow between the chambers A and B by way of the bore C, and so effectively snubs the rebound action until conditions change, tending to move the valve sleeve 5 back toward the position of Figure 1.

This valve sleeve 5 is closed at its end which is distant from the piston 2 to define a pressure face 50. It is acted on by a yieldable biasing force, preferably a light spring 51, reacting between its closed end and the abutment 35 at the base 29 of the piston rod within which it is guided, this spring tending to hold the valve sleeve 5 yieldably in the flow-restricting position of Figure 2. With parts in the normally fully extended position, as a landing leg would be preparatory to touching down, the ports 52 and 22 would be almost wholly out of registry. Upon contact with the ground and compressive movement of the shock absorber parts, the piston 2 moves toward the head 10, as in Figure 1, and pressure developed in the chamber B, communicating past the restricting ring 24 into the interior of the bore C, acts on the pressure face 50 of the valve sleeve 5, urging the valve sleeve upwardly in opposition to the spring bias at 51. This moves parts into the free-flow position, wherein the ports 22 and 52 are largely in registry, and consequently flow from the chamber B into the chamber A is but slightly restricted, and primarily is restricted only by the liquid flow metering elements 4 and 24 at the completion of the stroke.

Immediately rebound movement begins, in the direction of the arrow 7, and regardless of the extent of the compressional movement, pressure witin the bore C and acting against the pressure face 50 is relieved, and pressure in the chamber A becomes superior to that in the chamber B. The valve sleeve 5 immediately returns under the influence of the spring 51, or any equivalent biasing means, to the flow-restricting position of Figure 2, wherein there is but little space for liquid to pass through these ports between the chambers A and B. All liquid that passes from the chamber A to the chamber B must pass through the restriction thus created between the ports 22 and 52. It will pass also between the liquid flow metering elements 4 and 24, but it is to be emphasized that it is the entire volume that passes from the chamber A to the chamber B during extensional movement that must pass through a restricted orifice between the ports 52 and 22. In consequence, and because it is not merely a minor volume of the entire amount of liquid, the energy absorption due to rebound damping is accomplished at minimum pressure and with the resultant heat distributed throughout the entire body of liquid.

It will be observed that there is a port 34 between the chamber wherein the spring 51 is situated, intermediate the pressure face 50 and the abutment 35, on the one hand, and the upper air-filled portion of the chamber A on the other hand, so that there is no entrapment of air in this chamber to impede movement of the valve sleeve 5 to the free-flow position, nor to impede prompt return of the sleeve to the restricting position.

I claim as my invention:

1. In an oleo-pneumatic shock absorber, relatively reciprocable strut-forming elements including a cylinder and a piston slidably fitted therein and dividing the cylinder into closed first and second chambers, a hollow piston rod extending through the first chamber and supporting the piston, its bore communicating through the piston with the second chamber, and constituting the sole liquid passage between said chambers, liquid-flow-metering elements carried by the cylinder and by the piston, respectively, cooperating to control relative movement, especially contractive movement, of the piston and cylinder, and consequent movement of liquid from one chamber to the other, a valve sleeve slidably mounted upon the piston rod, and closed at one end to define a pressure face open by way of the passage through the piston rod's bore to pressure within the second chamber, said valve sleeve and the piston rod having cooperating ports affording communication by way of such bore between the two chambers, and spring means urging the valve sleeve along the piston rod into a position wherein, during extensional movement, such communication is restricted, but said spring means being of a strength to yield and permit the valve sleeve to move to a less restrictive position upon subjection of the valve sleeve's pressure face to pressure within the second chamber during compressive movement of the piston and cylinder.

2. An oleo-pneumatic shock absorber as in claim 4, wherein the valve sleeve is mounted within the bore of the piston rod.

3. An oleo-pneumatic shock absorber as in claim 1, wherein the liquid-flow-metering elements comprise a metering pin fixed relative to the cylinder in position to enter the bore of the piston rod, and a ring carried by the piston in position surrounding the metering pin, and cooperating therewith to restrict flow between the chambers at predetermined positions in the relative reciprocation of the piston and cylinder.

4. In an oleo-pneumatic shock absorber, relatively reciprocable strut-forming elements including a cylinder closed at one end and a piston slidably fitted therein and dividing the cylinder space into a first and a closed second chambers, a tube telescopingly interfitted with the cylinder and closed at its end, to close the first chamber at the end opposite the cylinder's closed end, a hollow piston rod supported fixedly upon the closed end of said tube, extending through the first chamber and supporting the piston fixedly relative to the tube, with its bore communicating through the piston with the second chamber, and having ports affording communication between its bore and the first chamber, liquid-flow-metering elements including a metering pin supported fixedly upon the cylinder's closed end and projecting within the bore of the piston rod, and a restrictive ring carried by the piston, surrounding the metering pin and cooperating therewith to meter liquid flow by way of such bore and ports between the two chambers, a valve sleeve guided for axial movement within the piston rod's bore, and closed at its end which is distant from the piston to define a pressure face, said sleeve having ports generally registering in one position with the piston rod's ports, for free flow of liquid between the second and the first chambers, except as restricted by the liquid-flow-metering elements, during relative compressive movement of the piston and cylinder, but shiftable, by axial shifting of the sleeve, into position to restrict flow of liquid from the first to the second chamber during relative extensional movement of the piston and cylinder, and spring means urging said sleeve to its flow-restricting position, but of a strength to yield, and to permit shifting of the sleeve into its free-flow position, under the influence of pressure from within the second chamber applied to its pressure face during relative compressive movement of the piston and cylinder.

5. An oleo-pneumatic shock absorber comprising two cylinders telescopingly interfitted and closed at their respective outer ends, a piston fitted slidably within one of said cylinders and a hollow piston rod fixed to the the other of said cylinders and extending into the paired cylinder to support said piston fixedly with relation to the cylinder whereto the piston rod is fixed, whereby the piston as it moves within the one cylinder divides the cylinder space as a whole into a first and a second chamber, the first whereof is filled with liquid at all times and the second whereof is partly filled with liquid and partly with a compressible gas; the piston having a metering orifice affording the only communication between the piston rod's bore and the first chamber, and the piston rod having ports affording the only communication between its bore, and hence by way of the metering orifice between the first chamber, and the second chamber; a metering pin fixed to the cylinder which moves relative to the piston, projecting through said metering orifice, and shaped relative to the latter to restrict liquid flow between the chambers at least during the final compressive relative movement of the parts; a hollow valve sleeve slidably mounted upon the piston rod, and ported to control flow through said piston rod ports by movement axially relative thereto, said valve sleeve having a head at its end distant from said metering orifice, which is subject to pressure within the piston rod's bore, spring means operatively connected to said valve sleeve, biasing the latter during extending movement into position to close said ports and so to restrict all flow of liquid between the two chambers, and the valve sleeve's head being movable by reason of its subjection to pressure within the piston rod's bore during compressive movement, to shift the valve sleeve, in opposition to said spring means, into valve-open position.

References Cited in the file of this patent
UNITED STATES PATENTS

| | | |
|---|---|---|
| 2,155,605 | Levy | Apr. 25, 1939 |
| 2,308,404 | Thornhill | Jan. 12, 1943 |
| 2,539,842 | Katz | Jan. 30, 1951 |
| 2,545,833 | Wallace | Mar. 20, 1951 |
| 2,614,833 | Laugaudin | Oct. 21, 1952 |